(12) United States Patent
Garner et al.

(10) Patent No.: US 10,653,056 B2
(45) Date of Patent: May 19, 2020

(54) SEED METERING SYSTEM AND METHOD OF OPERATING THE SAME

(71) Applicant: Deere & Company, Moline, IL (US)

(72) Inventors: Elijah B. Garner, Bettendorf, IA (US); Beth A. Wolfs, Tiffin, IA (US); Nathaniel Pearson, Moline, IL (US)

(73) Assignee: DEERE & COMPANY, Moline, IL (US)

(*) Notice: Subject to any disclaimer, the term of this patent is extended or adjusted under 35 U.S.C. 154(b) by 135 days.

(21) Appl. No.: 15/857,800

(22) Filed: Dec. 29, 2017

(65) Prior Publication Data

US 2018/0116101 A1    May 3, 2018

Related U.S. Application Data

(63) Continuation of application No. 14/871,515, filed on Sep. 30, 2015, now abandoned.

(51) Int. Cl.
*A01C 7/04* (2006.01)
*A01C 5/06* (2006.01)
(Continued)

(52) U.S. Cl.
CPC ............. *A01C 7/046* (2013.01); *A01C 5/062* (2013.01); *A01C 7/04* (2013.01); *A01C 7/082* (2013.01); *A01C 7/105* (2013.01)

(58) Field of Classification Search
CPC ......... A01C 7/046; A01C 7/044; A01C 7/042; A01C 7/04; A01C 7/00; A01C 5/062;
(Continued)

(56) References Cited

U.S. PATENT DOCUMENTS

| 4,638,748 A | 1/1987 | Kopecky |
| 4,779,765 A | 10/1988 | Neumeyer |

(Continued)

FOREIGN PATENT DOCUMENTS

| CA | 2741267 | 11/2012 |
| DE | 8416161 U1 | 9/1985 |

(Continued)

OTHER PUBLICATIONS

German Patent Office Search Report for Application No. 102017216623.1 dated Aug. 29, 2018 (11 pages, statement of relevance included).

(Continued)

*Primary Examiner* — Christopher J. Novosad
(74) *Attorney, Agent, or Firm* — Michael Best & Friedrich LLP

(57) ABSTRACT

A seed metering system includes a seed tank including a seed tank outlet, and a number of row units. Each and every row unit of the number of row units comprises a singulating meter in selective communication with the seed tank outlet, a bypass conduit in selective communication with the seed tank outlet, and an outlet. The seed metering system further includes a volumetric metering system positioned upstream of the number of row units and operable to volumetrically meter the plurality of seeds. The seed metering system is operable in a first mode of operation in which the seed tank outlet communicates with each singulating meter via the volumetric metering system to singulate the plurality of seeds. The seed metering system is operable in a second mode of operation in which the seed tank outlet communicates with each bypass conduit via the volumetric metering system and seeds are not singulated.

20 Claims, 8 Drawing Sheets

(51) Int. Cl.
*A01C 7/08* (2006.01)
*A01C 7/10* (2006.01)

(58) Field of Classification Search
CPC .. A01C 5/06; A01C 5/00; A01C 7/082; A01C 7/081; A01C 7/08; A01C 7/105; A01C 7/102; A01C 7/10
USPC .......................................................... 111/177
See application file for complete search history.

(56) References Cited

U.S. PATENT DOCUMENTS

| | | | |
|---|---|---|---|
| 4,793,742 A | | 12/1988 | Strand |
| 5,351,635 A | | 10/1994 | Hulicsko |
| 5,650,609 A | * | 7/1997 | Mertins ................ A01C 7/105 250/222.1 |
| 5,826,523 A | | 10/1998 | Gregor |
| 6,192,813 B1 | | 2/2001 | Memory et al. |
| 6,213,690 B1 | | 4/2001 | Gregor et al. |
| 6,283,679 B1 | | 9/2001 | Gregor et al. |
| 6,688,244 B1 | | 2/2004 | Mayer et al. |
| 6,935,255 B2 | | 8/2005 | Hagen et al. |
| 7,353,760 B2 | | 4/2008 | Mayerle et al. |
| 7,509,915 B2 | | 3/2009 | Memory |
| 7,555,990 B2 | | 7/2009 | Beaujot |
| 7,743,719 B2 | | 6/2010 | Memory |
| 7,765,943 B2 | | 8/2010 | Landphair |
| 7,938,075 B1 | | 5/2011 | Glendenning et al. |
| 8,132,521 B2 | | 3/2012 | Snipes et al. |
| 8,281,724 B2 | | 10/2012 | Snipes |
| 8,350,689 B2 | | 1/2013 | Mariman et al. |
| 8,666,608 B2 | | 3/2014 | Friggstad |
| 9,043,949 B2 | | 6/2015 | Liu et al. |
| 9,488,512 B2 | | 11/2016 | Hossain et al. |
| 9,596,803 B2 | | 3/2017 | Wendte et al. |
| 9,699,953 B2 | | 7/2017 | Jagow et al. |
| 2003/0133759 A1 | | 7/2003 | Winther |
| 2007/0266917 A1 | | 11/2007 | Riewerts et al. |
| 2008/0121154 A1 | * | 5/2008 | Memory ................ A01C 7/082 111/174 |
| 2009/0079624 A1 | | 3/2009 | Dean et al. |
| 2012/0226461 A1 | | 9/2012 | Kowalchuk |
| 2014/0165890 A1 | | 6/2014 | Graham |
| 2014/0216314 A1 | | 8/2014 | Bourgault et al. |
| 2014/0311598 A1 | | 10/2014 | Hui et al. |
| 2015/0090166 A1 | | 4/2015 | Allgaier et al. |
| 2015/0223392 A1 | | 8/2015 | Wilhelmi et al. |
| 2016/0037713 A1 | | 2/2016 | Wendte et al. |
| 2016/0088791 A1 | | 3/2016 | Horsch |
| 2016/0095274 A1 | | 4/2016 | Wendte et al. |
| 2016/0120107 A1 | | 5/2016 | Chahley et al. |
| 2016/0121284 A1 | | 5/2016 | Roberge et al. |
| 2016/0135359 A1 | | 5/2016 | Kowalchuk et al. |
| 2016/0157417 A1 | | 6/2016 | Funck |
| 2016/0234996 A1 | | 8/2016 | Sauder et al. |
| 2016/0295792 A1 | | 10/2016 | Secrest et al. |
| 2016/0302353 A1 | | 10/2016 | Wendte et al. |
| 2017/0086351 A1 | | 3/2017 | Garner et al. |
| 2017/0086352 A1 | | 3/2017 | Frasier et al. |
| 2017/0086355 A1 | | 3/2017 | Borkgren et al. |
| 2017/0086356 A1 | | 3/2017 | Schweitzer et al. |
| 2017/0127605 A1 | | 5/2017 | Roberge et al. |
| 2017/0156259 A1 | | 6/2017 | Barsi et al. |

FOREIGN PATENT DOCUMENTS

| | | |
|---|---|---|
| EP | 1591000 A1 | 11/2005 |
| EP | 2196079 | 6/2010 |
| EP | 2196079 A1 | 6/2010 |
| EP | 2765398 | 8/2014 |
| EP | 3000299 | 3/2016 |
| EP | 3235361 | 10/2017 |
| FR | 2973790 | 10/2012 |
| SU | 759063 | 8/1980 |
| WO | 2015094108 | 6/2015 |

OTHER PUBLICATIONS

German Patent Office Search Report for Application No. 102016218258.7 dated Apr. 24, 2019 (11 pages, statement of relevance included).
United States Patent Office Action for U.S. Appl. No. 15/290,345 dated Mar. 6, 2019 (10 pages).
Office Action from the US Patent and Trademark Office for U.S. Appl. No. 14/871,515 dated Jan. 27, 2017 (13 pages).
Office Action from the US Patent and Trademark Office for U.S. Appl. No. 14/871,633 dated Jan. 19, 2017 (13 pages).
Office Action from the US Patent and Trademark Office for U.S. Appl. No. 14/871,653 dated Jan. 31, 2017 (13 pages).
Office Action from the US Patent and Trademark Office for U.S. Appl. No. 14/871,515 dated May 10, 2017 (5 pages).
Office Action from the US Patent and Trademark Office for U.S. Appl. No. 14/871,633 dated Jul. 6, 2017 (14 pages).
Office Action from the US Patent and Trademark Office for U.S. Appl. No. 14/871,653 dated Jul. 17, 2017 (5 pages).
Office Action from the US Patent and Trademark Office for U.S. Appl. No. 14/871,515 dated Oct. 24, 2017 (13 pages).
EP16190733.2 Extended European Search Report dated Feb. 2, 2017 (9 pages).
Office Action from the US Patent and Trademark Office for U.S. Appl. No. 15/290,345 dated Jan. 17, 2018 (12 pages).

* cited by examiner

SEED METERING SYSTEM AND METHOD OF OPERATING THE SAME

CROSS-REFERENCE TO RELATED APPLICATIONS

The application is a continuation of U.S. patent application Ser. No. 14/871,515 filed Sep. 30, 2015, the entire contents of which are incorporated by reference.

BACKGROUND

The present disclosure relates to a seeding system and more particularly to a seed metering system and an associated method of metering seed.

SUMMARY

Current seeding practices tend to involve one of two types of seeding systems: planters and air seeders. Planters generally singulate or individually meter seeds prior to planting and are generally used to disperse seeds where precise placement is required for maximum yield and the seeding rate permits use of singulating technologies. Air seeders generally meter seeds volumetrically and are generally used in high rate seeding applications and where precise seed placement is of less importance or not practical due to the high rates.

A seed metering system for selectively metering a plurality of seeds includes an outlet of a source of seeds. A singulating meter is in selective communication with the outlet. A bypass conduit is in selective communication with the outlet. The seed metering system is operable in a first mode of operation in which the outlet communicates with the singulating meter to singulate the plurality of seeds. The seed metering system is further operable in a second mode of operation in which the outlet communicates with the bypass conduit and the plurality of seeds is not singulated.

A secondary metering system for a seeding apparatus, in which the seeding apparatus includes a primary metering system through which a plurality of seeds passes, includes a first path through which the plurality of seeds is configured to pass. The first path includes a singulating meter in selective communication with the primary metering system to singulate the plurality of seeds. The secondary metering system also includes a second path through which the plurality of seeds is configured to pass. The second path includes a bypass conduit in selective communication with the primary metering system. The second path bypasses singulation by the singulating meter.

A method of operating a metering system to meter a plurality of seeds includes operating the metering system in a first mode. The first mode includes a step of volumetrically metering a first portion of the plurality of seeds via a volumetric meter. The first mode also includes a step of singulating the first portion of the plurality of seeds via a singulating meter. The first mode further includes discharging the first portion of the plurality of seeds from the singulating meter.

A seed metering system for selectively metering a plurality of seeds includes a seed tank including a seed tank outlet, and a number of row units. Each and every row unit of the number of row units comprises a singulating meter in selective communication with the seed tank outlet, a bypass conduit in selective communication with the seed tank outlet, and an outlet common to and downstream of the singulating meter and the bypass conduit. The seed metering system further includes a volumetric metering system positioned upstream of the number of row units and operable to volumetrically meter the plurality of seeds. The seed metering system is operable in a first mode of operation in which the seed tank outlet communicates with each singulating meter via the volumetric metering system to singulate the plurality of seeds. The seed metering system is operable in a second mode of operation in which the seed tank outlet communicates with each bypass conduit via the volumetric metering system and seeds are not singulated.

A seeding apparatus includes a volumetric metering system through which seeds pass. A secondary metering system for the seeding apparatus includes a first path through which seeds are configured to pass, the first path extending from the volumetric metering system and including a singulating meter located in a housing, the singulating meter in selective communication with the volumetric metering system, the first path passing through the housing for singulation of seeds. The secondary metering system further includes a second path through which seeds are configured to pass, the second path extending from the volumetric metering system and including a bypass conduit in selective communication with the volumetric metering system, the second path passing through the housing and bypassing singulation by the singulating meter.

A singulating meter includes a housing, a singulating disk positioned within the housing and operable to singulate a plurality of seeds, a first seed path through the housing, wherein the first seed path permits singulation of the plurality of seeds, a second seed path through the housing, wherein the second seed path precludes singulation of seeds, and a control system operable to disconnect one of the first path or the second path to a volumetric metering system and to connect the other of the first path and the second path to the volumetric metering system.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
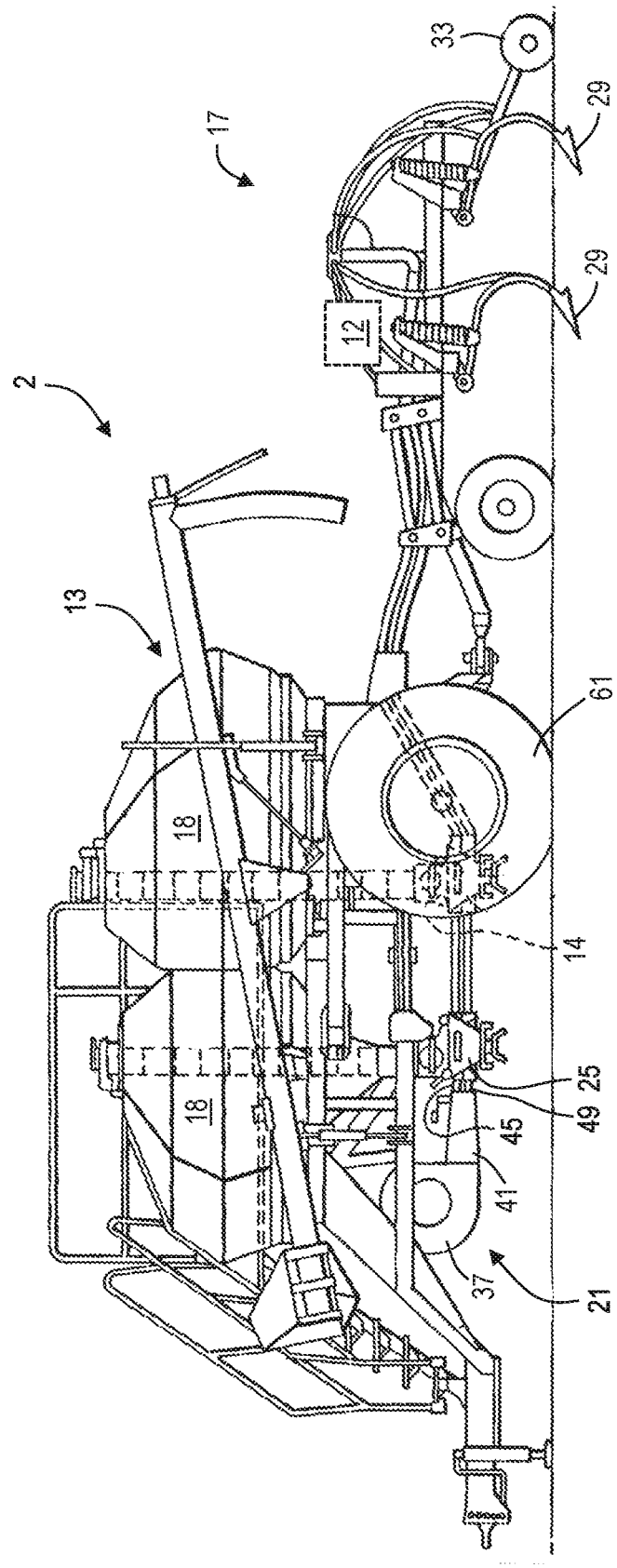
FIG. 1 is a side view of a seeding machine.

As shown in FIG. 1, seeding machine 2 comprises a seed cart 13 and a tilling implement 17. The seed cart is typically towed by a tractor through a field to be seeded. The seed cart 13 has a frame supporting a number of storage tanks 18 and wheels 61 are rotatably mounted to the frame. Each storage tank 18 is provided with a volumetric meter 14. The volumetric meters 14 are located below the storage tanks 18 and receive product therefrom for controlled feeding of product into a pneumatic distribution system 21. Located below each volumetric meter 14 is a primary air distribution manifold 25, part of the pneumatic distribution system 21. The tilling implement 17 comprises a frame to which ground openers 29 are mounted. The tilling implement 17 may be provided with seed row finishing equipment such as packers 33. FIG. 1 illustrates a double shot air seeder wherein a first product contained in one of the storage tanks 18 is directed to the top rank portion 45 of the air stream and the second product contained in the other of the storage tanks 18 is directed to the bottom rank portion 49 of the air stream. Triple shot applications in which three products are added to three different rank portions of the air stream are also utilized in certain situations.

The pneumatic distribution system 21 distributes metered product from the storage tanks 18 to the ground openers 29. The product contained in the storage tanks 18 may include seed, fertilizer or other agricultural particles. The pneumatic distribution system 21 comprises a blower 37 driven by a motor which directs a stream of pressurized air through an adjustable damper 41, which directs the air stream into a top rank portion directed into an upper rank of first tubes 45 and a bottom rank portion directed into a bottom rank of first tubes 49.

Figure 2:
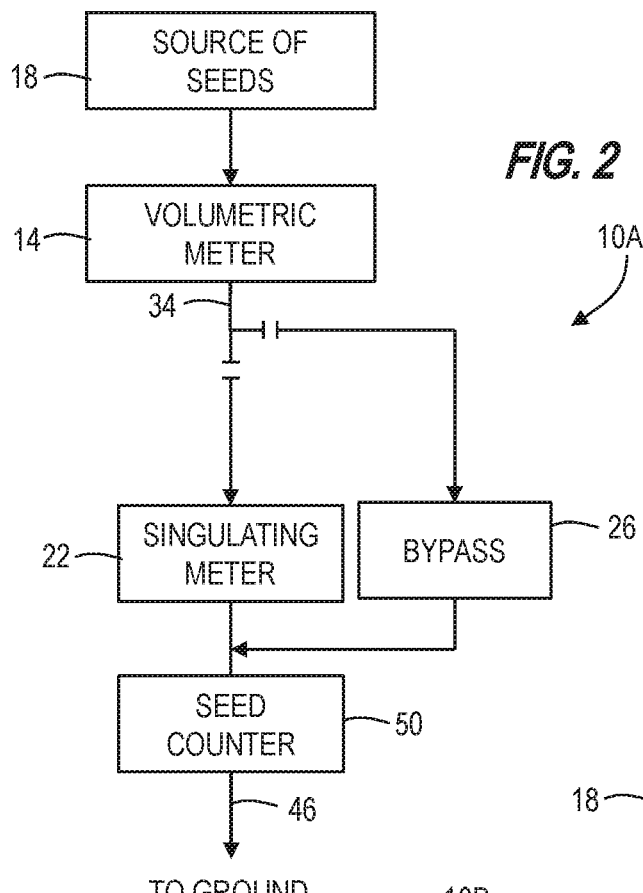
FIG. 2 is a schematic representation of a seed metering system.
Figure 3:
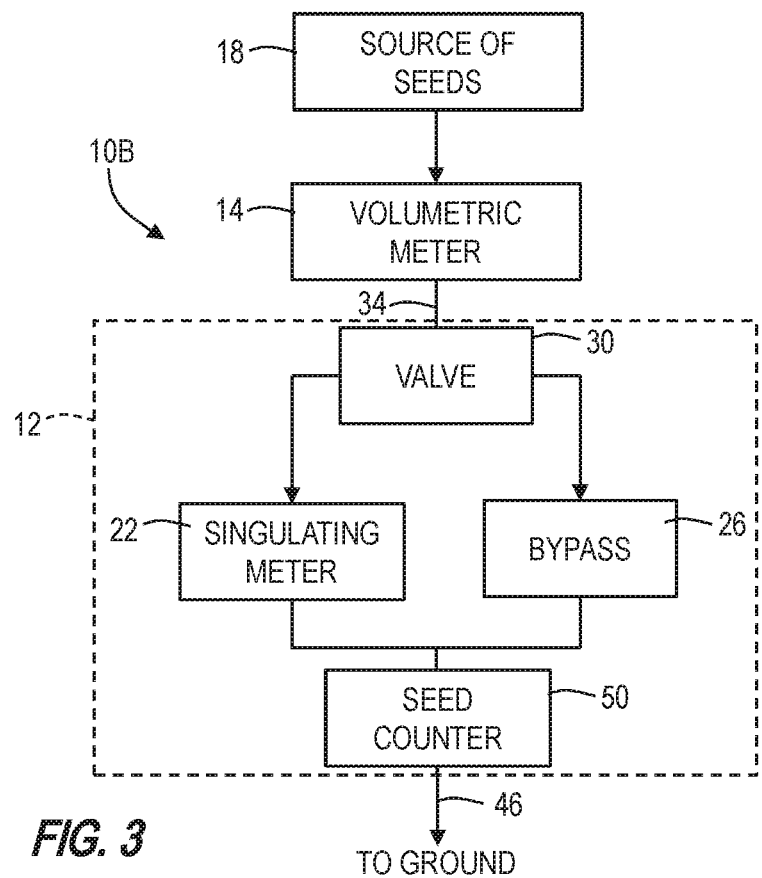
FIG. 3 is a schematic representation of another seed metering system.

FIGS. 2-3 schematically illustrate seed metering systems 10A, 10B for use in a planting operation, such as seeding a field or dispersing agricultural particles (e.g., fertilizer, etc.). Throughout this application, when referring to seeds or seeding, it is understood that one skilled in the art could equally apply the seed metering system 10A, 10B to agricultural particles and the dispersing of the agricultural particles. The seed metering systems 10A, 10B can be used with or as a part of the seeding machine 2.

Each seed metering system 10A, 10B includes a volumetric meter 14, which receives and meters the seeds or agricultural particles from the source 18 in the form of a tank, hopper, air cart, mobile seed storage device, or other bulk container as previously described and illustrated in FIG. 1. When volumetrically metered, the seeds travel one of two separate paths to either a singulating meter 22 or a bypass assembly having a bypass conduit 26.

Referring to FIG. 2 and seed metering system 10A, the paths may include a single supply line 34 having an inlet fixed to the outlet of the volumetric meter 14 and a discharge interchangeable between the singulating meter 22 and the bypass conduit 26. If a user of the seed metering system 10A decides to only volumetrically meter the seeds, the path from the volumetric meter 14 may be manually disconnected from the singulating meter 22 and connected instead to the bypass conduit 26. If the user decides to singulate the seeds, the path from the volumetric meter 14 may be manually disconnected from the bypass conduit 26 and connected to the singulating meter 22. The unused inlet would be capped or otherwise blocked. Other conduit arrangements that alternate the flow path between the volumetric meter and the singulating meter 22 or the bypass conduit 26 are of course contemplated with the present disclosure.

As shown in FIG. 3, in the embodiment of seed metering system 10B a control system or assembly in the form of a control valve 30 may be actuated to change the path of the seeds between the singulating meter 22 and the bypass conduit 26. As will be further described below, the singulating meter 22, bypass conduit 26, and valve 30 can be formed as one packaged unit or subassembly 12 (shown schematically in FIG. 1). In other embodiments, the valve 30 may be remotely located from the meter 22 and bypass assembly nearer the volumetric meter 14.

The seed metering systems 10A, 10B are each therefore capable of functioning in two separate and mutually exclusive modes. The first mode involves metering the seeds twice, first metering the seeds volumetrically and then singulating the seeds, i.e., separating individual seeds from the volumetrically metered group of seeds and then introducing the seeds to the planting site. The second mode involves metering the seeds volumetrically and then bypassing the singulating meter 22 to introduce the seeds directly to the planting site.

Figure 4:
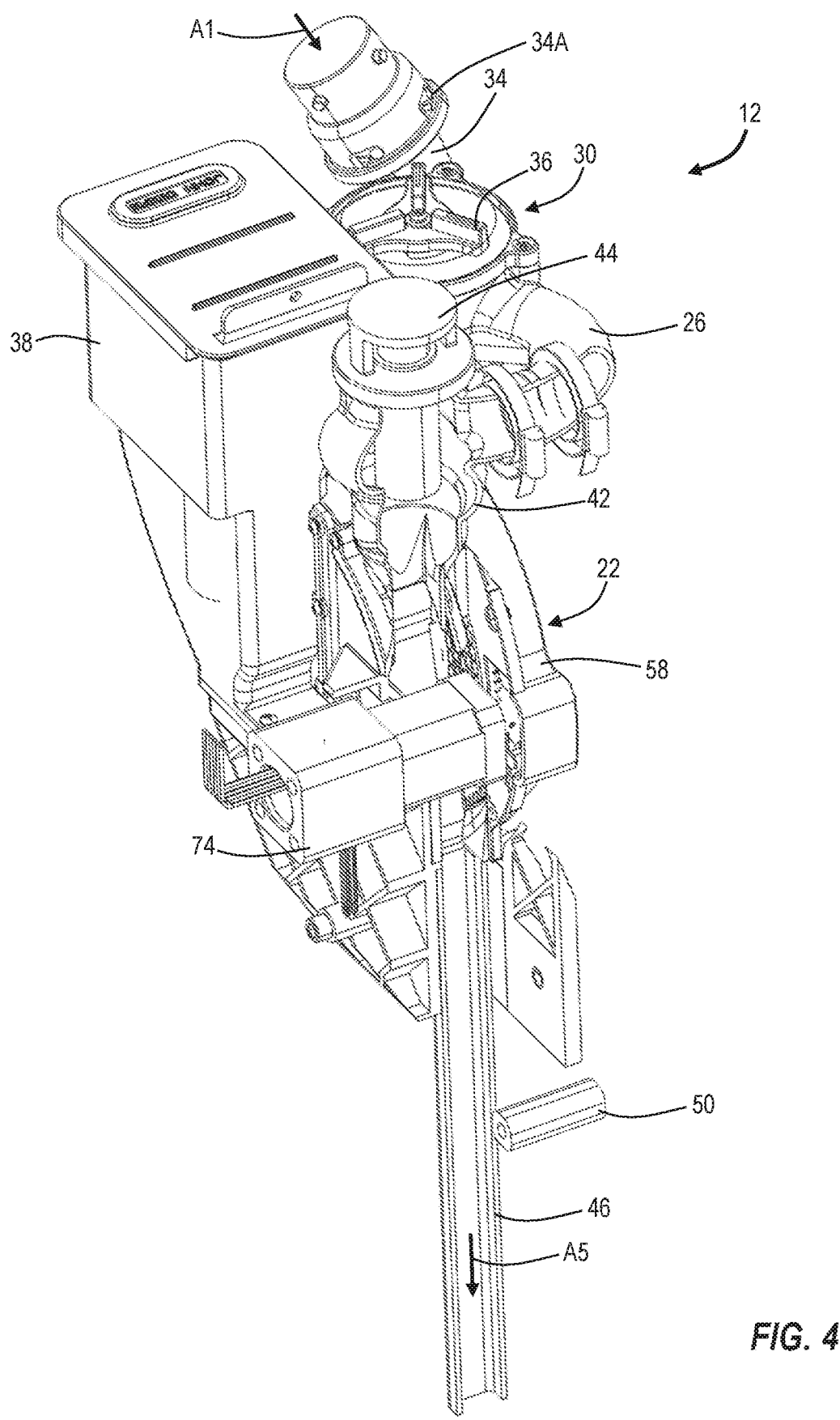
FIG. 4 is a perspective view of a singulating meter and bypass assembly including a partial cutaway of various components.
Figure 5:
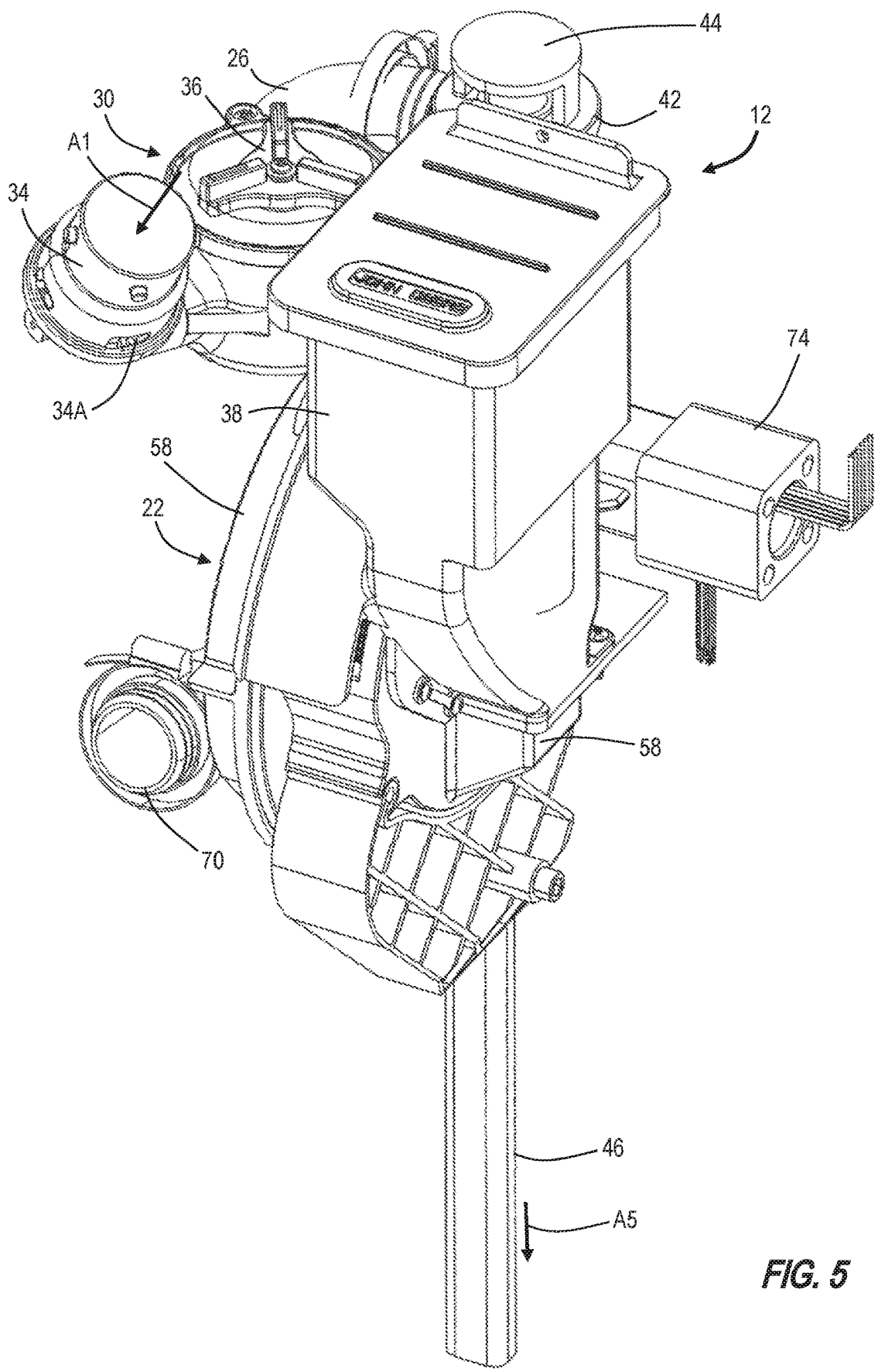
FIG. 5 is another perspective view of the meter and assembly of FIG. 4.
Figure 6:
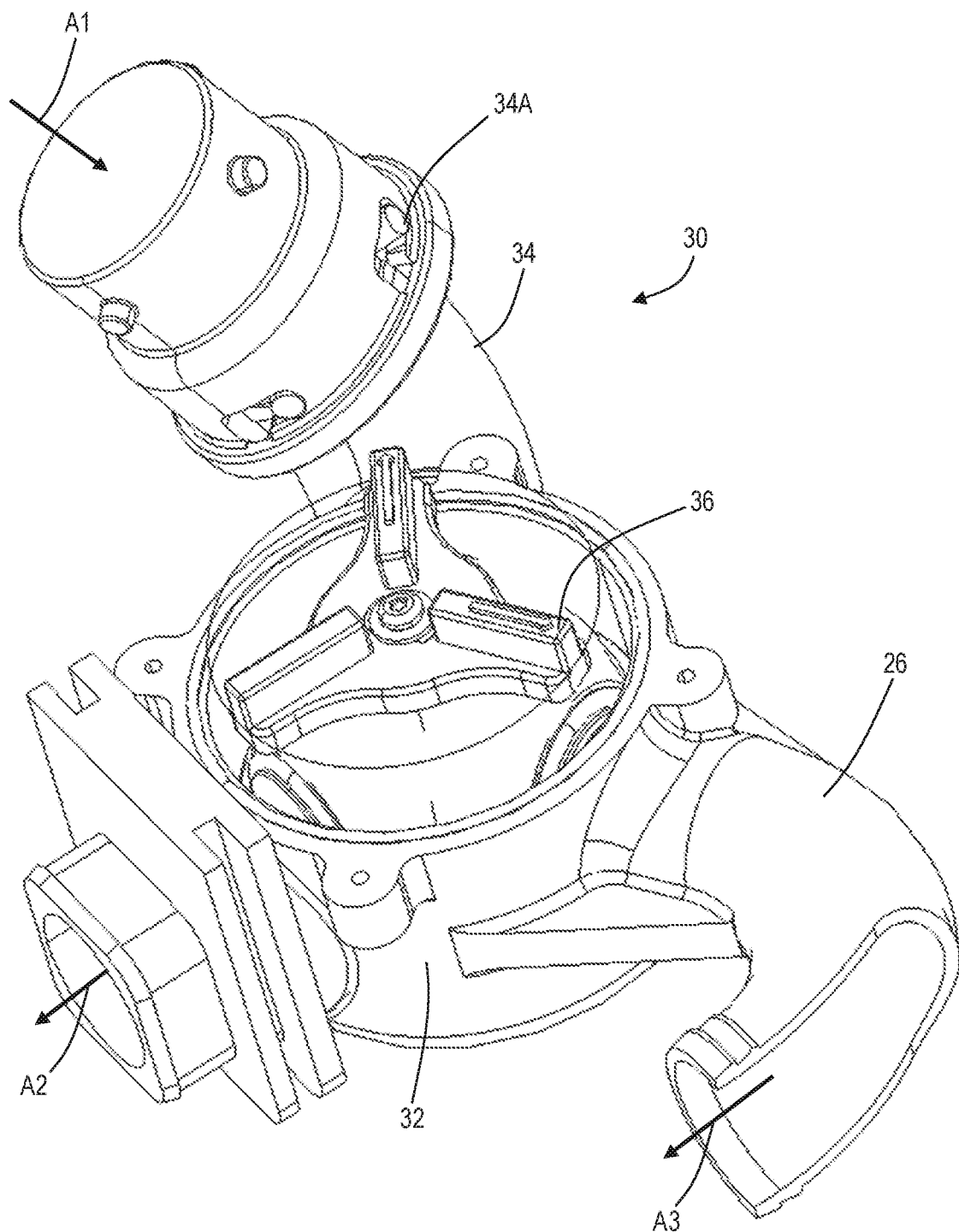
FIG. 6 is a perspective view of a valve of the meter and assembly of FIG. 4.

FIGS. 4-5 show perspective views of the seed metering system 10B downstream of the volumetric meter 14, i.e., the seed metering subassembly 12. The supply line 34 (or an end portion of the supply line 34 having a conduit connector 34A permitting the seed metering subassembly 12 to be removably securable to the volumetric meter 14) leads to the valve 30. The valve 30 comprises a housing 32 (the entirety of which is not shown—see FIG. 6) and a rotatable or otherwise actuatable valve assembly 36 capable of directing seeds towards one of two paths. Referring also to FIG. 6, the valve 30 may therefore take any form of functional three-way valve and may be actuated manually, automatically (e.g., hydraulically or electrically), either directly or remotely. The first path (which is associated with the first mode) leads to the singulating meter 22 and the second path (which is associated with the second mode) leads to the bypass conduit 26.

In the first mode, the valve 30 places the volumetric meter 14 in communication with a mini hopper 38. The mini hopper 38 is capable of holding and temporarily storing a quantity of seeds, the quantity less than that retained at the source 18. The mini hopper 38 can be a separate container adjacent to a housing 58 of the singulating meter or, alternatively, integrally formed as one piece with the singulating meter housing 58. The mini hopper 38 includes two openings. The first opening, or mini-hopper inlet (not shown), accepts seeds from the valve 30, and the second opening, or mini hopper outlet 62 (FIG. 8), discharges the seeds to a point of entry of the singulating meter 22, i.e., into the interior of the meter housing 58. Therefore, the mini hopper outlet 62 may also be considered a singulating meter inlet.

Figure 7:
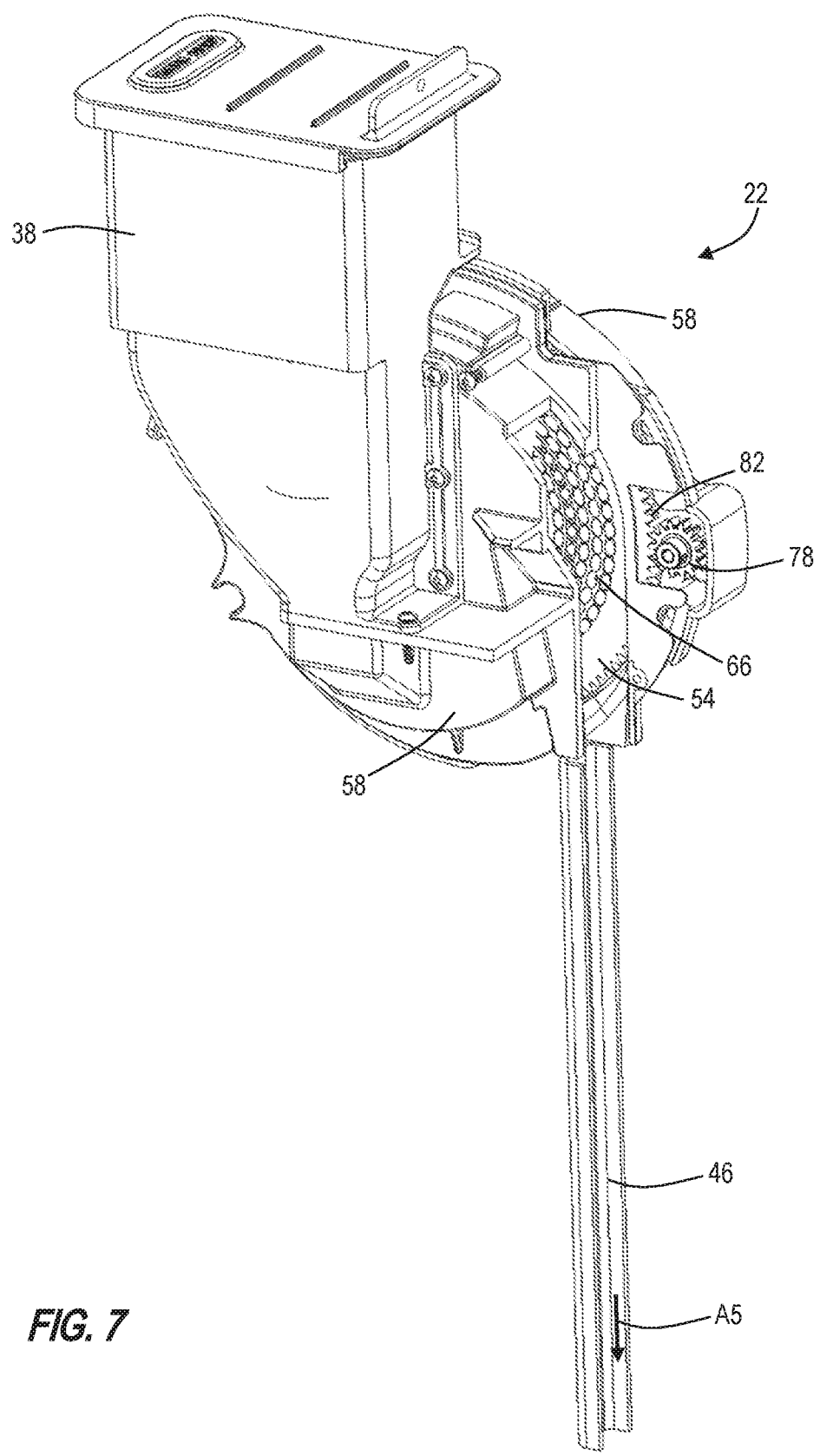
FIG. 7 is a perspective view of the meter and assembly of FIG. 4 with certain components removed.
Figure 8:
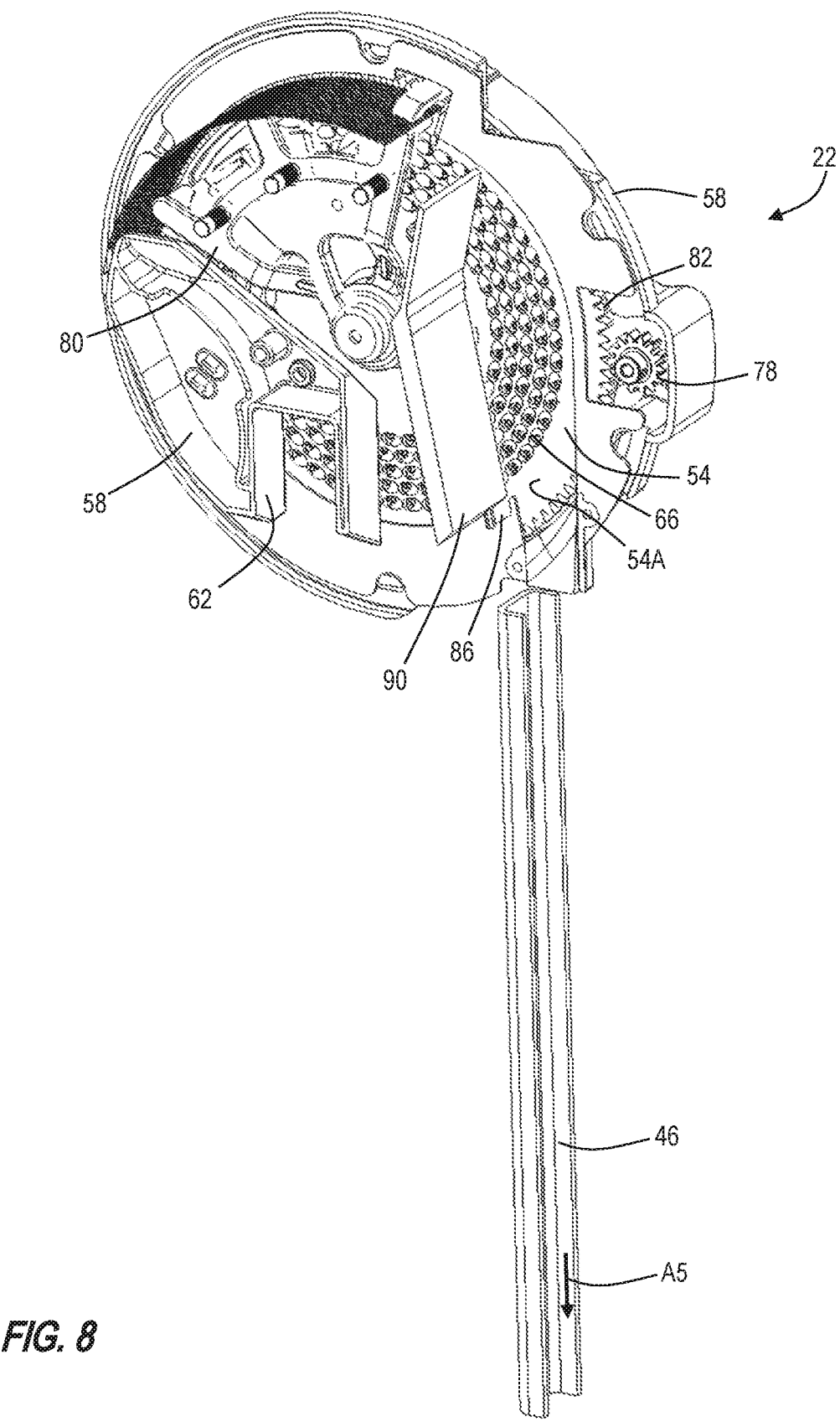
FIG. 8 is another perspective view of the meter and assembly of FIG. 7 with certain components removed.

Referring also to FIGS. 7-8, the singulating meter 22 includes a singulating disk 54 within the housing 58, which encloses the singulating disk 54. The singulating disk 54 includes a plurality of apertures 66 extending through the body of the disk 54 from a front surface 54A to an opposing rear surface (not shown). The apertures 66 are formed in circular rows set at different radial distances from the center of the disk 54. The disk 54 may alternatively have only a single circumferential row of apertures 66 at a constant radial distance. Each aperture 66 is sized to accommodate a single seed. A hose connection 70 (FIG. 5) is connected to the singulating meter housing 58 opposite the mini hopper 38 for a vacuum connection whereby the meter 22 is known as a vacuum seed meter. Alternatively, a positive pressure meter can be used instead of a vacuum meter where the seed side of the disk 54 is pressurized to an air pressure above ambient to create the pressure differential across the disk 54. A mechanical seed meter, such as a finger pick-up meter may also be used for the singulating meter.

The singulating meter 22 is driven by a motor 74 with a geared output shaft 78 (see FIGS. 5, 6, 8). The output shaft 78 engages with teeth 82 located about the periphery of the singulating disk 54 to rotate the disk 54 at a rate based on the speed of the motor and the gear ratio between the disk 54 and the output shaft 78. A doubles eliminator 80 ensures a one-to-one ratio of seed to each aperture 66. A brush 86 fixed with respect to the meter housing 58 by a brush mount 90 is positioned adjacent the disk 54, and more specifically, in contact with the front surface 54A.

The outlet conduit 46 serves as a common outlet from the interior of the meter housing 58 and may be in the form of a tube, hollow shaft, channel, belt, or similar means of conveyance suitable to transfer seed, fertilizer, or other agricultural particles to the ground. The outlet conduit 46 at the seed meter housing 58 is generally in vertical alignment with a seed release location on the disk 54 (e.g., around the three O'clock position in FIG. 8, near the shaft 78). Adjacent machinery (e.g., opener blade, plow, etc.) conventionally used to create a furrow in the ground into which the seeds are planted and close the furrow after the seeds have been planted are not herein described.

As further shown in FIG. 4, a seed sensor 50 is located at the common outlet 46 which can be in the form of an opening, or an elongated tube, channel or conduit. In other embodiments, the seed counter 50 may be positioned within the singulating meter housing 58.

In the second mode, the valve 30 places the volumetric meter 14 in communication with the bypass conduit 26. As best shown in FIGS. 4 and 6, the bypass conduit 26 is in the form of a hollow conduit or tube and leads to an inlet into the seed meter housing 58 generally in vertical alignment with the seed release location of the seed disk 54. In the illustrated embodiment, an air brake 42 is included in the bypass conduit 26 at the inlet to the seed meter housing. The air brake 42 has an internal spiral or cyclonic configuration with a top relief stack 44. In addition or alternatively, the air brake 42 may include a screen-based particle filter. In some embodiments the air brake 42 is integrally formed as one piece with the singulating meter housing 58. In other embodiments, an air brake 42 is not used and the bypass conduit 26 leads directly to the interior of the meter housing 58, which is in communication with the common outlet 46.

Arrow A1 designates the direction of the flow of seeds from the volumetric meter 14 into the inlet end of a supply line 34. In operation, and with the rotatable valve assembly 36 of the valve 30 positioned to direct the seeds toward the singulating meter 22 as designated by arrow A2 (FIG. 6), the valve 30 opens into the mini hopper 38.

The seeds are directed towards the singulating meter 22 and gather in the mini hopper 38 through the mini hopper inlet. When space within the singulating meter housing 58 permits, seeds from the mini hopper 38 enter the meter housing 58 via the mini hopper outlet 62 and are situated adjacent the front surface 54A of the singulating disk 54.

Driven by the motor 74, the singulating disk 54 rotates and, through the pressure differential between the front surface 54A and the rear surface of the disk 54 facilitated by the hose 70, the seeds within the housing 58 are either pulled or pushed into the apertures 66 and adhere to the front surface 54A of the disk 54. As the disk 54 rotates, the doubles eliminator 80 separates seed groups such that only one seed is rotationally carried per aperture 66. The rotating seeds travel a circumferential path with the apertures 66. The seeds eventually drop from their respective apertures 66 and, in some embodiments contact the brush 86 (FIG. 8). The pressure differential ceases at approximate contact with the brush 86 due to an internal divider on either side of the disk 54 disrupting the flow induced by the pressure differential. Upon displacement from the aperture 66, each seed 'drops' under the influence of gravity from the interior of the meter housing and, assisted by the configuration of the brush mount 90, into the common outlet conduit 46, falling past the seed counter 50 and to the ground, as indicated by arrow A5.

Figure 9:
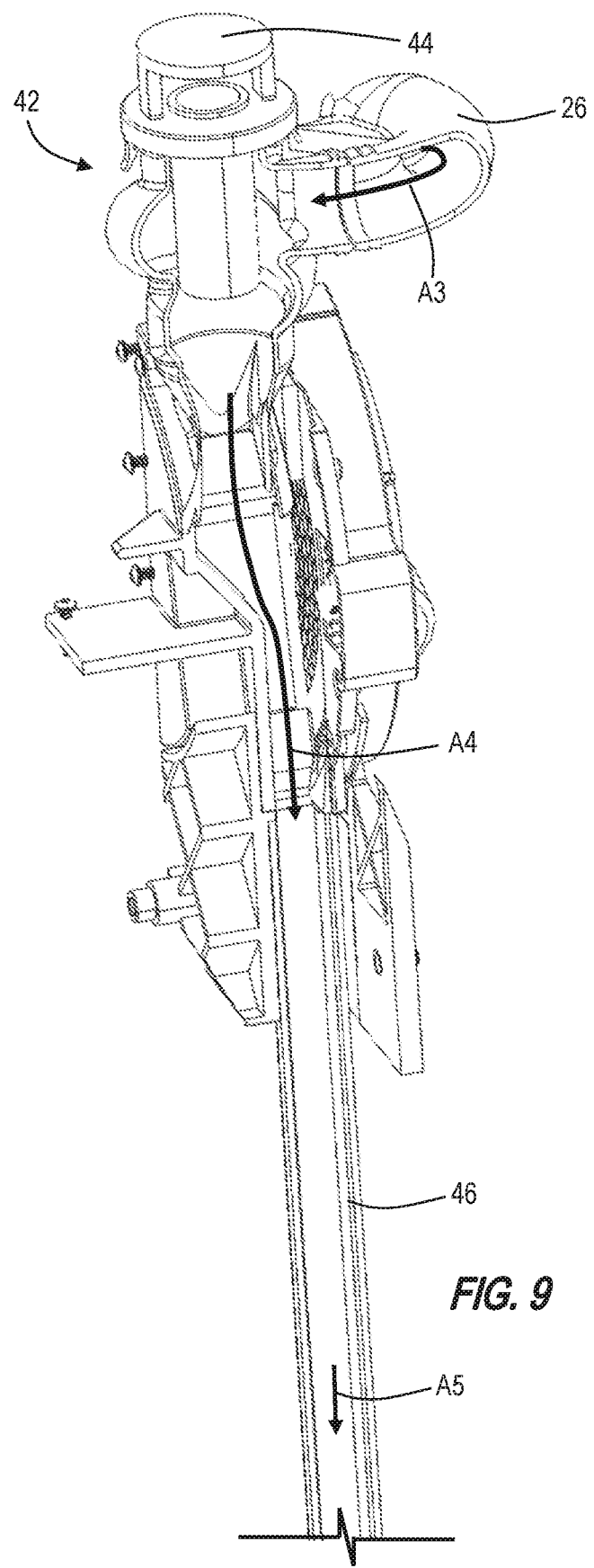
FIG. 9 is a partial perspective view of the bypass assembly illustrated in FIG. 4.

With the rotatable valve assembly 36 of the valve 30 positioned to direct the seeds toward the bypass conduit 26 as designated by arrow A3 (FIG. 6), the valve 30 opens into the bypass conduit 26, which carries the seeds to the seed meter housing 58 or as illustrated to the air brake 42. The air brake 42, which bleeds air from the top stack 44, decreases the velocity of the seeds prior to delivering, i.e., dropping, the seeds through the meter housing 58 into the common outlet 46. In this second mode, the seeds are not singulated, the disk 54 need not rotate, and the pressure differential generated through the use of the hose 70 can be turned off. In effect, a portion of the seed meter housing 58 acts as a partial duct from the air brake 42 to the common outlet 46, as shown by arrow A4 in FIG. 9. The common outlet 46 carries the seeds to the ground as indicated by arrow A5.

The seed sensor 50 counts the number of seeds which pass through both the singulating meter 22 and the bypass conduit 26 such that only one seed sensor 50 is required for both singulating and volumetrically metering (i.e., bypassing the singulating meter 22) the seeds. The seed sensor 50 communicates with a control unit (not shown), which tallies the number of planted seeds. The control unit may further measure or calculate the rate of seeding (e.g., seeds per unit of time) and relay this information to the operator of seed metering system 10B (or 10A) such that adjustments may be made to the rate of seeding or quantity of seeds planted. For example, the user could increase or decrease the rotational output speed of the motor 74 to adjust the number of seeds passing the seed sensor 50 from the singulating meter 22. The user could additionally adjust the volumetric metering to increase the rate of seeding through the bypass conduit 26.

The singulating meter 22 can be a secondary metering system option for a pre-existing and primary volumetric seed metering system. Alternatively and depending on the existing planting configuration, the seed metering subassembly 12 of FIGS. 4-5 can be inserted downstream of an existing volumetric meter 14 or provided as a removable or non-removable secondary metering system during initial manufacture. Alternatively, the seed metering system 10A, 10B can be a single system with both metering capabilities (i.e., volumetric, singulating) in a single unit. Utilizing this system, seeding can be switched from volumetric to singulating based on seed type and operator preference with minimal disruption. For example, it may be beneficial to plant unlike seeds in adjacent fields or planting areas. With a switch of the valve 30 (and depending on the configuration of the seed source 18 or multiple seed sources 18), one type of seed stored in a first seed source 18 may utilize the second mode for expedient seeding, and another type of seed stored in a second seed source 18 may utilize the first mode for more precise, calculated seeding. Alternatively, the user can vary metering strategies for a single type of seed by simply actuating the valve 30 between the two modes. Although described with respect to a single singulating meter 22 and bypass assembly, a seeding system would include multiple subassemblies 12, each associated with an individual row or furrow and configured to receive seeds from a single volumetric meter 14.

Various features of the disclosure are set forth in the following claims.

What is claimed is:

1. A seed metering system for selectively metering a plurality of seeds, the seed metering system comprising:
   a seed tank including a seed tank outlet;
   a number of row units, wherein each and every row unit of the number of row units comprises:
      a singulating meter in selective communication with the seed tank outlet,
      a bypass conduit in selective communication with the seed tank outlet, and
      an outlet common to and downstream of the singulating meter and the bypass conduit; and
   a volumetric metering system positioned upstream of the number of row units and operable to volumetrically meter the plurality of seeds,
   wherein the seed metering system is operable in a first mode of operation in which the seed tank outlet communicates with each singulating meter via the volumetric metering system to singulate the plurality of seeds, and
   wherein the seed metering system is operable in a second mode of operation in which the seed tank outlet communicates with each bypass conduit via the volumetric metering system and seeds are not singulated.

2. The seed metering system of claim 1, wherein each row unit further comprising a valve assembly operable to selectively communicate the singulating meter and the bypass conduit with the seed tank.

3. The seed metering system of claim 1, wherein each outlet common to and downstream of the singulating meter and the bypass conduit is configured to discharge the plurality of seeds to a furrow.

4. The seed metering system of claim 1, wherein each row unit further comprises a seed sensor at the outlet, the seed sensor configured to detect seeds from the singulating meter and the bypass conduit.

5. The seed metering system of claim 1, wherein the bypass conduit of each row unit further includes an air brake.

6. The seed metering system of claim 1, wherein the singulating meter of each row unit further includes a singulating meter housing and a singulating disk located within the housing, and wherein during the first mode and the second mode seeds are directed through the housing.

7. The seed metering system of claim 1, wherein the number of row units includes all row units communicable with the seed tank.

8. A secondary metering system for a seeding apparatus, the seeding apparatus including a volumetric metering system through which seeds pass, the secondary metering system comprising:
   a first path through which seeds are configured to pass, the first path extending from the volumetric metering system and including a singulating meter located in a housing, the singulating meter in selective communication with the volumetric metering system, the first path passing through the housing for singulation of seeds; and
   a second path through which seeds are configured to pass, the second path extending from the volumetric metering system and including a bypass conduit in selective communication with the volumetric metering system, the second path passing through the housing and bypassing singulation by the singulating meter.

9. The secondary metering system of claim 8, further comprising a control system operable to disconnect one of the first path or the second path to the volumetric metering system and to connect the other of the first path and the second path to the volumetric metering system.

10. The secondary metering system of claim 9, wherein the control system is a three-way valve assembly.

11. The secondary metering system of claim 8, further including an outlet common to and downstream of the first path and the second path.

12. The secondary metering system of claim 11, further comprising a seed sensor positioned at the outlet and configured to detect seeds.

13. The secondary metering system of claim 8, wherein the singulating meter includes a singulating disk located within the housing, the housing comprising a first inlet for directing seeds to the singulating disk, a second inlet for directing seeds from the bypass conduit, and a common outlet.

14. The secondary metering system of claim 13, wherein the common outlet is configured to disperse seeds in a furrow.

15. A singulating meter comprising:
   a housing;
   a singulating disk positioned within the housing and operable to singulate a plurality of seeds;
   a first seed path through the housing, wherein the first seed path permits singulation of the plurality of seeds;
   a second seed path through the housing, wherein the second seed path precludes singulation of seeds; and
   a control system operable to disconnect one of the first path or the second path to a volumetric metering system and to connect the other of the first path and the second path to the volumetric metering system.

16. The singulating meter of claim 15, wherein the control system is a three-way valve assembly.

17. The singulating meter of claim 15, further including an outlet common to and downstream of the first path and the second path.

18. The singulating meter of claim 17, further comprising a seed sensor positioned at the outlet and operable to detect seeds.

19. The singulating meter of claim 15, wherein the housing comprises a first inlet for the first seed path configured to direct seeds to the singulating disk, a second inlet for the second seed path, and a common outlet.

20. The singulating meter of claim 19, wherein the common outlet is configured to disperse the plurality of seeds in a furrow.

* * * * *